March 10, 1931. C. A. CARNEY 1,795,760
SHEAVE MOUNTING
Filed Nov. 7, 1928
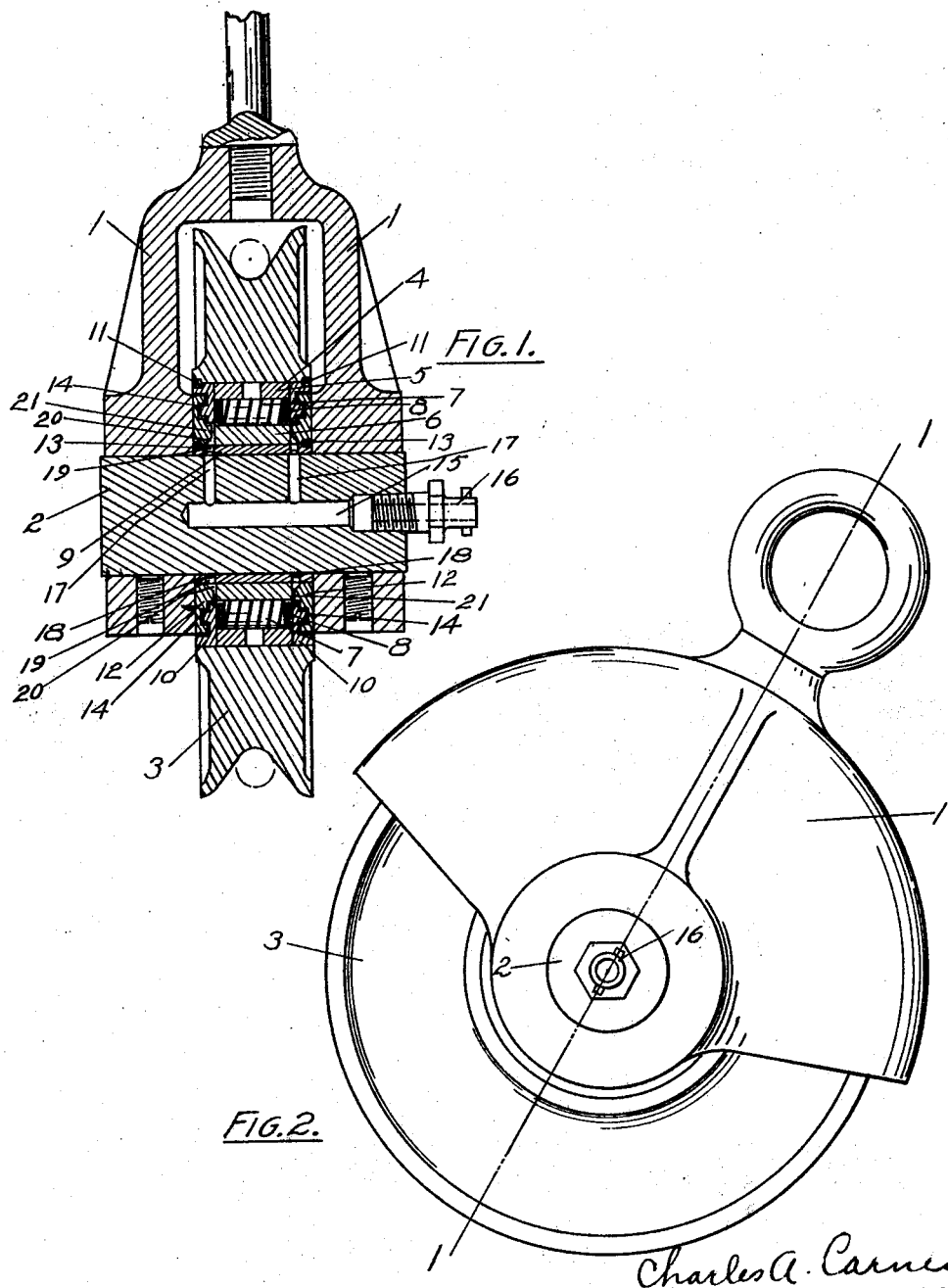
Charles A. Carney
INVENTOR.
BY
ATTORNEYS.

Patented Mar. 10, 1931

1,795,760

UNITED STATES PATENT OFFICE

CHARLES A. CARNEY, OF ERIE, PENNSYLVANIA, ASSIGNOR TO G. H. WILLIAMS COMPANY, OF ERIE, PENNSYLVANIA, A CORPORATION OF PENNSYLVANIA

SHEAVE MOUNTING

Application filed November 7, 1928. Serial No. 317,851.

Sheave mountings, such as are used in pulley blocks are subject to very severe use not only as to the strains to which the block is usually subjected but in very many places to conditions such as the introduction of dirt and dust into the bearing. The present invention is designed to improve the mounting for such sheaves and to prove means for preventing the introduction of dirt to the bearing surfaces. Features and details of the invention will appear from the specification and claims.

A preferred embodiment of the invention is illustrated in the accompanying drawings as follows:—

Fig. 1 shows a section on the line 1—1 in Fig. 2.

Fig. 2 a side elevation of a pulley block in which is arranged the sheave mounting.

1 marks the pulley block cheeks, and 2 the supporting pin, the pin being secured in the cheeks by set screws 1a.

A sheave pulley 3 is arranged in the block and mounted on a roller bearing 4, the roller bearing comprising the outer sleeve 5, the inner sleeve 6, intervening rollers 7 and spacing plates 8, these sleeves, rollers and plates being a common roller bearing unit.

Arranged within the sleeve 6 is a sleeve 9, this sleeve being ordinarily fixed relatively to the pin.

A closure plate 10 in the form of a ring is secured by screws 11 in the pulley and at the ends of the bearing. A complementary plate 12 in the form of a ring is secured by screws 13 on the sleeve 9. These plates are provided with inter-related annular ribs and grooves on their opposing surfaces forming a labyrinth channel 14 between the surfaces, the outer end of the channel being nearer the outer periphery of the plates and the inner end of this channel nearer the inner periphery of the plates.

An oil opening 15 is arranged at the axis of the pin 2 and is provided with a fitting 16 by means of which lubricant may be introduced into the opening 15 under pressure. Radial discharge passages 17 extend from the opening 15 to the surface of the pin and discharge into annular grooves 18 arranged in the sleeve 9 in register with the passages 17. Discharge openings 19 lead from the grooves 18 through the sleeve 9. Annular spaces 20 are arranged between the inner sleeve of the bearing 6 and the plates 12 which are in communication with the discharge openings 19. These spaces communicate through the passage 21 with the inner termini of the channels 14.

It will readily be seen that as lubricant is forced into the opening 15 it finds its way by the passages 17, grooves 18, openings 19, spaces 20, passages 21 to the inner termini of the channels. The passage 21 not only connects to the channels but also to the space occupied by the rollers so that as lubricant is forced into the opening 15 it finds its way into the space between the rollers and some of the lubricant is forced out through the channels 14 carrying with it any dirt that may have entered the outer part of the channels. The labyrinth arrangement of the channels prevents the ready working out of the lubricant from this channel sealing the lubricant in these channels during a normal use of the sheave.

What I claim as new is:—

1. In a sheave mounting, the combination of a sheave pulley; a pin on which the sheave pulley is mounted with a journal bearing between the pulley and pin; and complementary closure plates at the ends of the bearing, one rotating with the pulley and the other locked with the pin, said plates having inter-related axially faced annular ribs and grooves forming labyrinth channels between the plates.

2. In a sheave mounting, the combination of a sheave pulley; a pin on which the sheave pulley is mounted with a journal bearing between the pulley and pin; complementary closure plates at the ends of the bearing, one rotating with the pulley and the other locked with the pin, said plates having inter-related axially faced annular ribs and grooves forming labyrinth channels between the plates; and means delivering lubricant under pressure to the bearing and the inner termini of the channels.

3. In a sheave mounting, the combination of a sheave pulley; a pin on which the pulley is mounted with a journal bearing between the pulley and pin, said pin having oil passages terminating in radial discharges; a sleeve on the pin having an annular groove registering with the discharge passages and discharge openings leading from the groove; and complementary closure plates at the ends of the bearing, one rotating with the pulley and the other locked with the pin, said plates having inter-related annular ribs and grooves forming labyrinth channels between the plates, the inner termini of the channels connecting with the discharge openings.

4. In a sheave mounting, the combination of a sheave pulley; a pin on which the sheave pulley is mounted with a roller bearing between the pulley and pin; and complementary closure plates at the ends of the bearing, one rotating with the pulley and the other locked with the pin, said plates having inter-related axially faced annular ribs and grooves forming labyrinth channels between the plates.

5. In a sheave mounting, the combination of a sheave pulley; a pin on which the sheave pulley is mounted with a roller bearing between the pulley and pin; complementary closure plates at the ends of the bearing, one rotating with the pulley and the other locked with the pin, said plates having inter-related axially faced annular ribs and grooves forming labyrinth channels between the plates; and means delivering lubricant under pressure to the bearing and the inner termini of the channels.

6. In a sheave mounting, the combination of a sheave pulley; a pin on which the pulley is mounted with a roller bearing between the pulley and pin, said pin having oil passages terminating in radial discharges; a sleeve on the pin having an annular groove registering with the discharge passages and discharge openings leading from the grooves; and complementary closure plates at the ends of the bearings, one rotating with the pulley and the other locked with the pin, said plates having inter-related annular ribs and grooves forming labyrinth channels between the plates, the inner termini of the channels connecting with the discharge openings.

In testimony whereof I have hereunto set my hand.

CHARLES A. CARNEY.